Feb. 20, 1923.
F. STEVENS
1,446,436
MACHINE SYNCHRONIZING SYSTEM
Filed Sept. 30, 1920    2 sheets-sheet 2
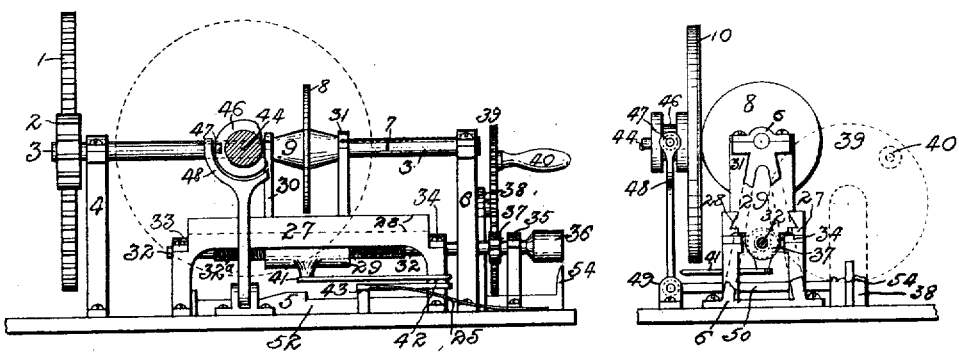
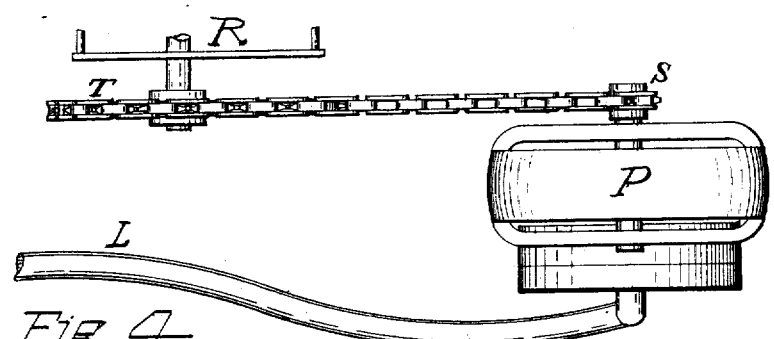
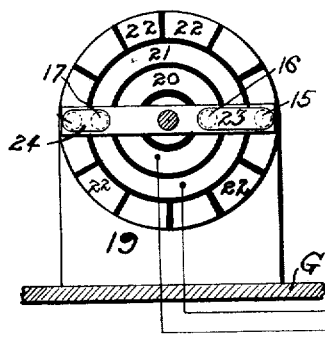
WITNESSES:
Frank Stevens
INVENTOR
ATTORNEY Patented Feb. 20, 1923.

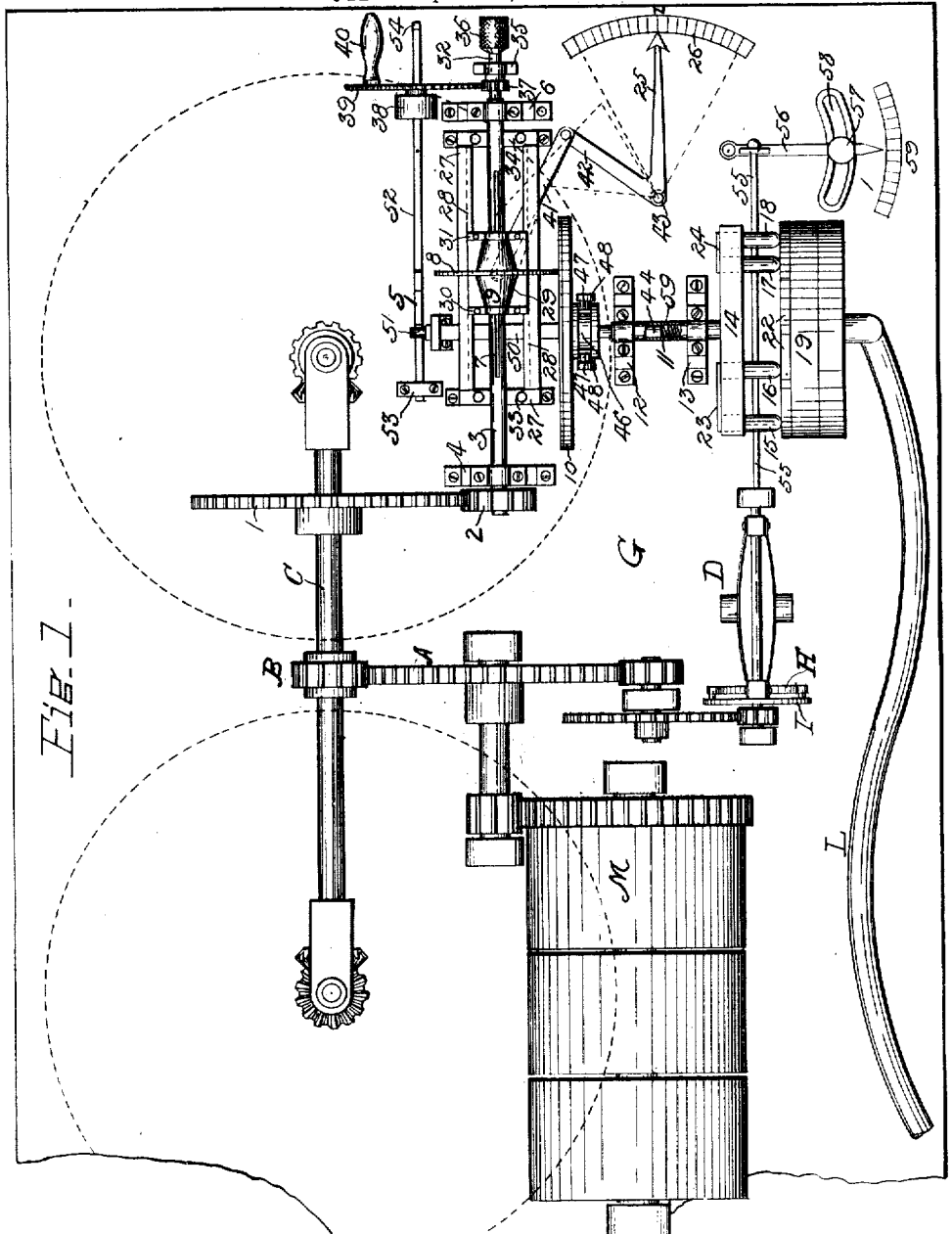

1,446,436

UNITED STATES PATENT OFFICE.

FRANK STEVENS, OF PHILADELPHIA, PENNSYLVANIA, ASSIGNOR TO CHARLES R. KEEGAN, OF PHILADELPHIA, PENNSYLVANIA.

MACHINE SYNCHRONIZING SYSTEM.

Application filed September 30, 1920. Serial No. 413,916.

*To all whom it may concern:*

Be it known that I, FRANK STEVENS, a citizen of the United States, residing at Philadelphia, in the county of Philadelphia and State of Pennsylvania, have invented a new and useful Machine Synchronizing System, of which the following is a specification.

My invention relates to means for controlling, with mathematical precision, speed relations between any driven machine and one or more other independently driven machines intended to be operated in conjunction therewith; and its objects are, to provide means to automatically insure absolutely uniform and unvarying normal speed relations, to afford means to alter any established automatic normal ratio while the several machines are in operation and set up a new normal; to introduce means of sufficient sensitiveness and delicacy of construction and operation to permit of very slight changes of ratio; with positively acting means to indicate with great accuracy any automatic normal ratio that may be prevailing; and, to afford other valuable helps in synchronizing two or more machines of any character as will more clearly appear in the specification and drawings.

I have found that, in order to secure the required degree of mechanical sensitiveness to insure very slight but extremely accurate alterations of speed between the primary or standard machine and one or more others, it is expedient to establish the speed varying mechanism at a point where the power being transmitted is negligible and, consequently, the adjustment mechanism while operating to control relatively high powers and heavy machinery may be small and delicate in construction.

I accomplish these results by the combination of mechanisms and the construction hereinafter described, a form of which involving a phonograph and a motion picture projector, is shown by way of example in the accompanying drawings, in which—

Figure 1 is a plan view of my invention attached to a phonograph so as to control the speed of a moving picture projector; Figure 2 a front elevation of the same with the commutator parts removed and the phonograph proper omitted; Figure 3, an end elevation of the same, viewed from the right side of Figure 1; Figure 4, a plan view of the electric motor controlled by the rotations of the commutator shown in Figure 1 and showing the speed reducing transmission to the projector; and, Figure 5, a face elevation of the commutator directly affected by my mechanism and directly influencing the electric motor.

Similar indices relate to similar parts throughout the views.

The spring-motor M is the driving power for the phonograph acting through the gear A, engaged with the pinion B on the main drive shaft C of the phonograph. The motor M is, of course, provided with the usual centrifugal governor D, whereby the speed of rotation of the records to be reproduced may be set at any desired uniform normal rate.

On the drive shaft C is secured a gear, 1, meshing into a pinion, 2, secured on the shaft 3, retained horizontally in the bearings 4 and 6. Shaft 3 is provided with a long keyway, 7, to enable a friction disc, 8, to be splined thereon so as to be laterally reciprocable for a considerable distance longitudinally therealong. This disc is provided with an ample hub, 9, to afford accurate rotation with the shaft 3, both while running undisturbed or when being reciprocated during revolution. The periphery of this disc 8 is normally in firm driving contact with the face of a larger disc, 10, rotatably secured to the shaft 11, of the commutator brush carriage 14. Shaft 11 is supported by the standards with bearings 12 and 13 and carries the rotatable brush holder 14 into which are fitted electrical contact brushes 15, 16, 17 and 18. These brushes are resiliently mounted so as to press against and make good electrical contact with the commutator 19. The face is provided with two inlaid concentric metallic rings, 20 and 21, which are wired to a source of electromotive force through a switch N. The brush 16 always bears upon ring 20 and the brush 17 upon ring 21. Brushes 15 and 18 bear, at diametrically opposite points, upon the sectoral metallic inlaid contacts 22, which are equal and similar and are symmetrically arranged in the circular zone lying between ring 21 and the circumference of the commutator face. These contacts correspond to the number of poles in the electric motor P and are electrically connected therewith, consecutively, by the system of wiring well known in the art and of which no detailed explanation is necessary to this specification, beyond the statement that it is such as to cause the speed of rotation of the motor armature and shaft to be dependent solely upon the speed of rotation of the aforesaid brushes. Therefore, perfect control of the speed of rotation of the shaft 11 affords absolute control over the speed of the electric motor P, and of whatever mechanism it may be used to operate. Brushes 15 and 16 are electrically connected by a metallic plate 23 on the brush-holder 14, and brushes 17 and 18 are in similar electrical contact through plate 24, whereby the current from the mains through switch N is properly distributed to the motor poles by the rotation of these brushes.

It will be evident that the success of the operation of synchronizing, holding in synchrony, and restoring lost synchrony centres in the capacity to perfectly control the speed of rotation of the brushholder 14, and that such control is primarily founded upon the efficiency of the means whereby the holder may be normally rotated at some (any) desired uniform ratio with the machine by which it is operated, and then, upon the accuracy of operation of means employed to alter any such ratio whenever desired or required.

This primary control results in the construction herewith illustrated and at present preferred by me, from the direct train of transmission from the phonograph drive shaft C, through spur gear 1, pinion 2, shaft 3, disc 8 and disc 10 secured to the brush-carrier shaft 11, and any desired uniform normal running ratio between the speed of the phonograph and the speed of the brushes may be fixed to prevail by merely shifting the disc 8 across the face of disc 10 to the position required and there retaining it. For the purposes shown this operation is ordinarily done before the start of the spring motor M. The conventional normal speed for phonographic records being 80 R. P. M. the shaft C is thus set to run, by manipulating the governor D. This rate being rather slow for the rotation of the electric motor M, the gears 1 and 2 are timed in the fixed diametral ratio of 1 to 3 whereby the wheel 8 is caused to rotate at 240 R. P. M. which rate is transmitted to the commutator brushes by fixing the diametral ratio of the drive disc 8 and the driven disc 10 at 1 to 1, when the indicator pointer will be at the centre, "N," on scale 20. This, under the electrical conditions already described, insures a like uniform speed of 240 R. P. M. for the motor P. This rate being too high for projector R is timed down to the accepted normal for motion picture machines, 60 R. P. M., by means of the chain drive connections S, over the 1 to 4 sprockets S and T.

It is now evident that any lateral motion along the shaft 3, of the disc 8 must act to instantly alter the speed of the brushes and either accelerate or retard the speed of the motor P and projector R, according to the direction of such lateral motion. The important feature to be comprehended at this stage of the explanation is that the "work" done or lead carried by the disc 10 is only that which is required to whirl the tips of the brushes in concentric circles over the face of the commutator, and, as these tips are spheral and the commutator surface very highly and smoothly finished there is practically no friction; and, as the mass involved is quite small, the momentum is very trifling, so that the actual load is negligible. This condition, resulting from the novel selection of a motor operated by a removed commutator and the choice of this opportune point where nothing but sufficient power to actuate this diminutive mechanism is invoved as the particular location for the variable speed control, permits of a delicacy and refinement of construction utterly impossible of operation where a comparatively heavy load is being carried. To illustrate: with but the small power necessary to be transmitted the periphery or driving circumference of disc 8 which makes rolling contact with disc 10, may be so narrow that its path of contact over the face of the disc may be fairly accurately described as a rather broad linear circle, rather than as a surface or plane. This is important where extreme accuracy is demanded, for a very slight variation of the diametral ratio where these clutches engage causes a decided change in the driven speed. Where disc 8 is two inches in diameter and is engaged with disc 10 at precisely one inch from the axis of the latter, a change of one-tenth of an inch either way will produce a difference of approximately 12.5 R. P. M. on a normal speed of 240 R. P. M. It necessarily follows that the broader the edge of disc 8, the greater the possibility of inaccuracy of results, for the actual point of contact may be more or less continually changing or playing back and forth along the line of contact measured transversely across the periphery of disc 8. Therefore, the finer it is possible to make this driving edge consistent with the necessary driving efficiency, the more certain will be results. For the same fundamental reason all the members entering into the construction of my variable speed controlling mechanism may be so finely formed as to be capable of responding to extremely delicate manipulation. Consequently my device is small and compact and affords efficient means for making minute and gradual changes, or for rapidly producing very decided increases or decreases in the speed of the brushes, as will appear from the following description.

Immediately beneath the shaft 3 is positioned a bed or table 27, having horizontal guideways 28, in which a traveling stock 29 is accurately fitted, as in a lathe, to be reciprocated by the rotation of a centrally disposed screw-threaded shaft. This stock is provided with two vertically extending arms, 30 and 31, which have central bearings to permit of the smooth rotation therein of the shaft 3, and between these two arms is accurately positioned the long hub 9 of disc 8, so that there shall be no play or lost motion and that any reciprocation of the stock along the guideways 28, must cause precisely equivalent sidewise movements of this disc. Longitudinally through the body of this stock is drilled and finely tapped a long threaded bearing through which extends the adjustment or regulating shaft or rod 32, correspondingly threaded, 32, for a distance sufficient to cause, when rotated, ample reciprocation of the stock 29 to reach any position desired. The shaft 32 is supported in bearings 33 and 34 in the table 27 and in a third bearing, 35, near its outer extremity, which end is provided with a knurled operating head, 36, for use when gradual and minute adjustment only is required. Adjacent the bearing 35 is a pinion, 37, fast to the shaft 32 and, suitably supported in a standard, 38, so as to be rotatably engaged with this pinion, is the gear 39, several times larger, to impart rapid rotation to the shaft 32 when a prompt and rapid speed change is demanded. To operate this gearing a cranking handle, 40, is attached to the outer face of the gear wheel 39.

To properly inform and guide the operator in manipulating these controls, an indicator must be provided and it must be accurate and reliable to a very precise degree. To insure absolute precision to the readings on the scale 26 it is essential to take precautions to avoid any back lash or other form of lost motion and, consequently, gear transmission is not desirable. I have shown a lever operated form consisting of a link, 41, pivoted to the bottom of the stock 29 at a central point vertically beneath the disc 8, so as to be midway between the guideways 28. The other end of this link is jointed to an indicator member in the form of an elbow-lever, 42, pivoted at its angle, 43, to the bed of the framework G of the phonograph, and having its indicator arm 25 in the form of an arrow or pointer. Thus, as the traveling stock 29 is advanced or withdrawn by the rotation of shaft 32, the point of the arrow describes a horizontal arc which is properly calibrated and provided with a graduate scale.

In order to afford a ready means for uncoupling the discs 8 and 10, the shaft 11 is hollow for a sufficient distance to receive and permit of reciprocation a slidable spindle, 44, splined therein, and which may be considered an integral part of the disc 10. A helical spring, 59, of appropriate power is interposed between the bottom of the hollow tubular portion of shaft 11 and the encased end of the spindle 44, whereby the disc 10 is urged and normally held with due pressure in good working contact with the periphery of drive disc 8. The hub of the disc 10 has an annular groove or channel, 46, to engage rollers 47 mounted at the tip ends, respectively, of the bifurcated vertical arm, 48, of an elbow-lever, fulcrumed at 49, to the bed of the frame. The horizontal arm 50 of this elbow-lever has at its extremity a roller, 51, which projects over the upper surface of a rod, 52, slidable longitudinally through the guide 53, and the standard 38. This rod 52 extends to a point convenient to the other control members, 36 and 40, so that these kindred parts may be closely grouped, and terminates in a vertically extending handle 54. The space between circumference of the roller 51 and the flat top surface of the rod 52, is infinitesimal, being but sufficient to prevent any contact which could impede the action of spring 59 in preserving the necessary driving contact between discs 10 and 8. An upward incline 5 and a rest space at the proper elevation, are formed on the upper and contacting surface of rod 52, immediately adjacent to the roller 51, to act in elevating the arm 50 and holding it up, when the rod is pushed inwardly. This action results in the drawing away and keeping the disc 10 out of contact with disc 8; and, of course, a pull on the handle 54, immediately restores this contact through the reaction of the spring 59.

The speed control for the phonograph itself is regulated by the conventional swiveled friction brake H acting on the governor disc I. This brake H is pivoted to the bed of the machine, a longitudinally slidable rod 55 linking it to an operating and indicating lever 56, also pivoted to the bed and provided with a convenient operating knob 57 connected with a binding screw and clamp operating within the clamping channel 58, as is well known. By this means, with pointer end of lever 56 and the scale 59 any desired normal speed for the phonograph may be established.

It is to be understood that the speeds herein recited are merely illustrative. Those relating to the phonograph and the projector are, as mentioned, simply conventional. Other machines which may be coupled in a similar manner as these herein used to explain my invention for synchronizing, would no doubt be operated at many different ratios, depending entirely on the character of the respective functions to be harmonized and kept in harmony. But the principles involved and the operation would be similar in every instance. Likewise, the rate at which the electric motor P is caused to run in this illustration is optional. It is a speed which I have continuously employed, with good results and is an exact multiple of the respective rates at which my two principal mechanisms normally operate. But, it is very evident that the gears 1 and 2 might be of different diameters respectively, and the sprocket wheels S and T might have a ratio different from the one herein used, without in any manner altering the operation, or departing from the main results to be attained, viz, to establish at will any relative speeds and to maintain perfect control thereof.

For the purpose of illustrating my invention and its application I have shown and described one form thereof, although it is to be understood that the various instrumentalities of which my invention consists can be variously arranged and organized, and that my invention is not to be limited to the precise arrangement and organization herein shown and described; and that I hereby reserve the right to re-organize and re-arrange these instrumentalities within the scope of my claims.

I am aware that systems for synchronizing involving the use of variable speed gears and clutches have been invented and patented and are not novel and I do not claim such a system broadly, but I do claim:

1. In a synchronizing system of the character described, in combination with a piece of machinery and its motive power, an electric motor, a detached commutator therefor, intermediate driving connections between said piece of machinery and said commutator, and means in said driving connections to alter the speed of said commutator without affecting the speed of said piece of machinery.

2. In a synchronizing system of the character described, in combination with a piece of machinery and its motive power, an electric motor, a detached commutator therefor, intermediate driving connections between said piece of machinery and said commutator, means in said driving connections to vary the speed of said commutator without varying the speed of said piece of machinery, means to indicate the degree of such variations of speed, and means to disconnect said driving connections from said commutator.

3. In a synchronizing system of the character described, in combination with a detached commutator for an electric motor, a rotatable brush holder, a friction disc to rotate said holder, another friction disc engaged therewith, means to rotate said latter disc, hand operated means to alter the diametral operating ratio of said discs, means to disengage said discs, and means to indicate the effect of said alteration.

4. In a synchronizing system of the character described, in combination, an electric motor, a detached commutator therefor, a machine including motor therefor, variable speed mechanism so connected with said machine and said commutator as to rotate the latter, and hand operated means to control said variable speed mechanism whereby the speed of said commutator may be varied without changing the speed of said machine.

5. In a synchronizing system of the character described, in combination, an electric motor, a detached commutator therefor, a machine including motor therefor, variable speed mechanism so connected with said machine and said commutator as to rotate the latter, hand operated means to control said variable speed mechanism whereby the speed of said commutator may be varied without changing the speed of said machine, means to indicate the degree of such variations, and means to disconnect said variable speed mechanism from said commutator.

6. In a synchronizing machine system of the character described in combination with a detached commutator for an electric motor, means to vary the speed of said commutator comprising a rotatable brush holder, a friction disc to rotate said holder, another friction disc peripherally engaged with the face of said former disc, means to rotate said latter disc, a hand rotatable shaft, means actuated by the rotation thereof to laterally reciprocate said latter disc, means to indicate the effect of such reciprocation, and means to disengage said discs and hold them apart.

7. In a synchronizing machine system of the character described in combination with a detached commutator for an electric motor, means to vary the speed of said commutator comprising a rotatable brush holder, a friction disc to rotate said holder, another friction disc peripherally engaged with the face of said former disc, means to rotate said latter disc, a rotatable hand shaft, means to slowly rotate the same, alternate means to rapidly rotate the same, means to indicate the effect of any rotation of said shaft, means actuated by the rotation of said shaft to laterally reciprocate said latter disc, and means to disengage said discs and to hold them apart.

8. In a synchronizing system of the character described, in combination with a detached commutator for an electric motor, means to vary the speed of said commutator comprising a rotatable brush holder, a friction disc, a resiliently telescopic shaft to transmit rotation from said disc to said holder, a slotted shaft, another friction disc splined thereon and peripherally engaged with the face of said former disc, a threaded shaft parallel to said slotted shaft, a reciprocatory member engaged by said threaded shaft and axially engaging said latter disc, a handle to slowly rotate said threaded shaft, a small gear wheel on said threaded shaft, a considerably larger gear wheel engaged therewith, a handle to rotate said large gear wheel, an annularly slotted hub to said former disc, a lever engaging said hub whereby said former disc may be reciprocated along its axis, a hand rod to operate said lever, a speed rate indicator for said commutator, levers actuated by the motion of said reciprocatory member to operate said indicator, and means to indicate the uniform speed of said splined disc.

9. A synchronizing system of the character described in combination with a phonograph and a motion picture machine comprising, an electric motor to operate said machine, a detached commutator therefor, variable speed mechanism so connected with a rotatable member of said phonograph and with said commutator as to transmit rotation to said commutator, hand operated means to control said variable speed mechanism whereby the speed of said commutator may be changed without changing the speed of said phonograph, means to indicate the degree of any such change, and means to disconnect said variable speed mechanism from said commutator.

Signed at Philadelphia, Pennsylvania, this seventh day of September, A. D. 1920.

FRANK STEVENS.

Witnesses:
ALBERT S. WRAY,
L. J. KEEGAN.